April 1, 1930.　　　　　R. A. SHIPLEY　　　　　1,752,702
APPARATUS FOR MANUFACTURING HOLLOW TILE
Filed July 9, 1927　　　4 Sheets-Sheet 3

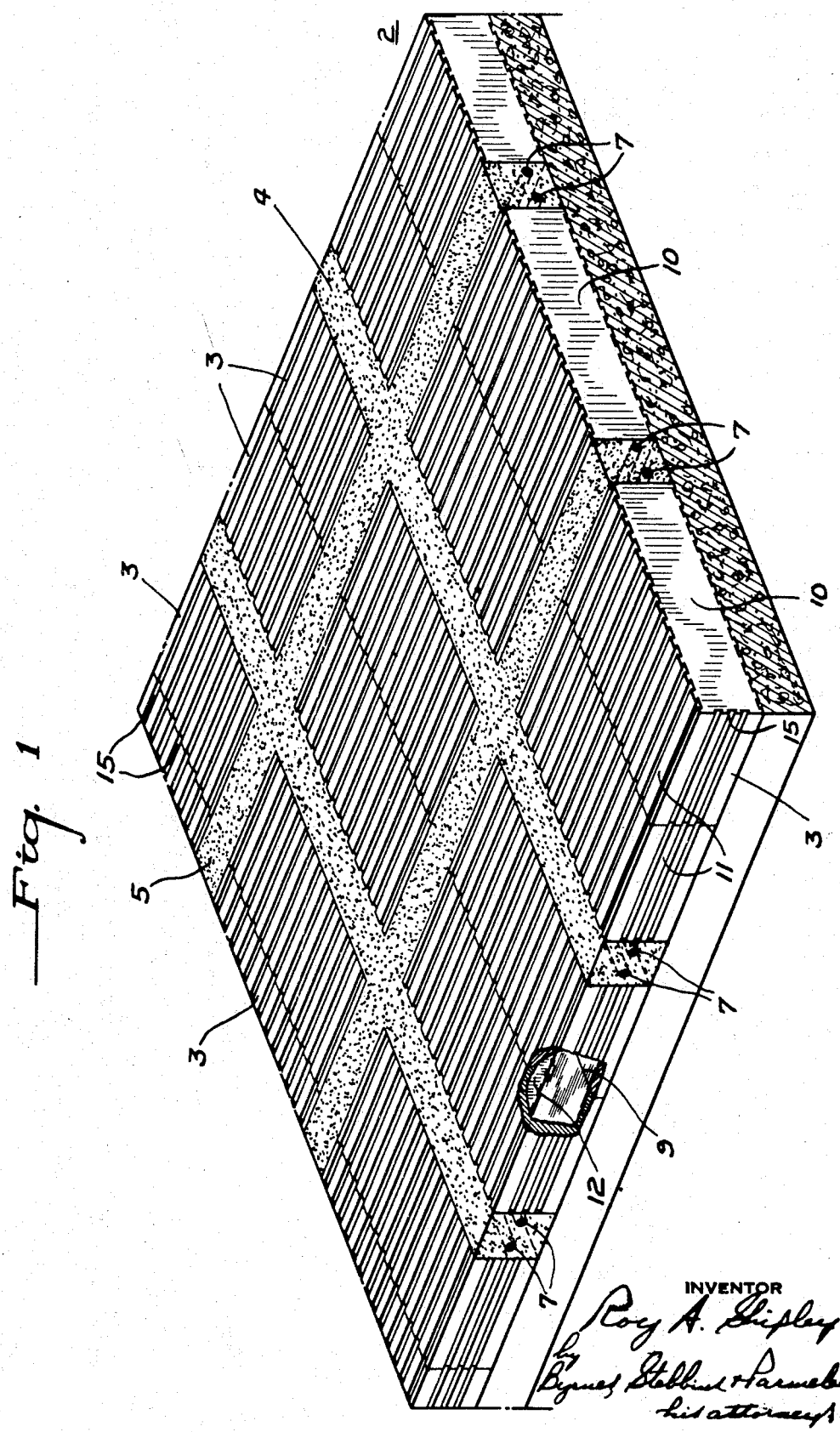

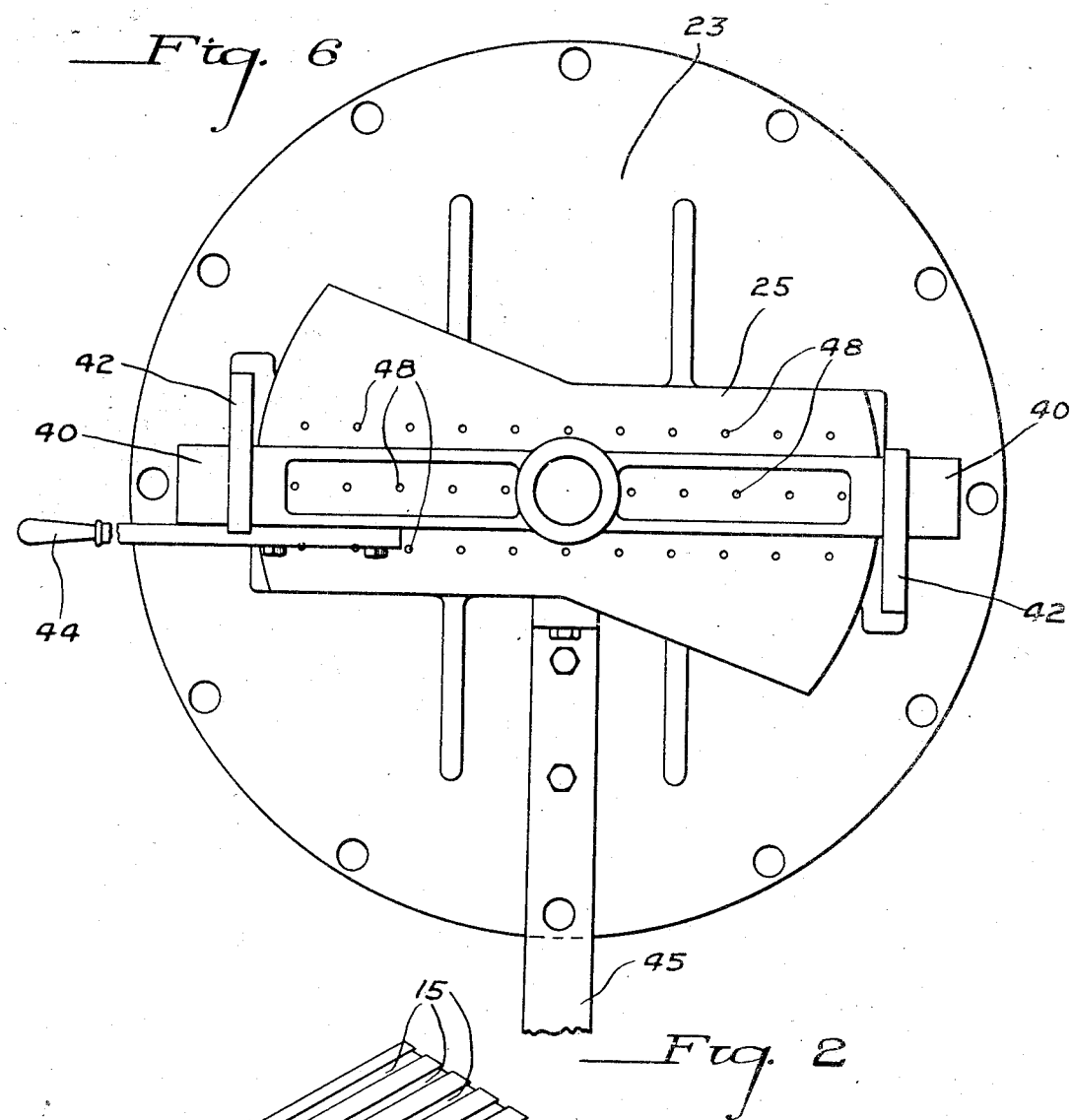
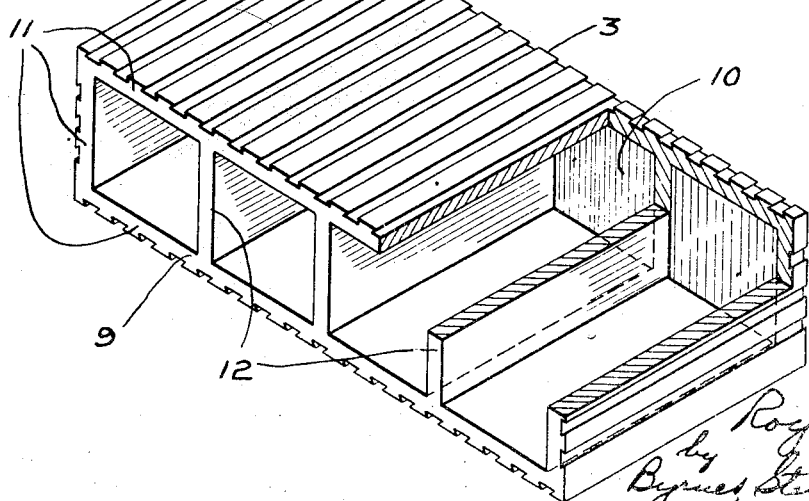

INVENTOR
Roy A. Shipley
by Byrnes, Stebbins & Anselee
his attorneys

April 1, 1930.　　　　　R. A. SHIPLEY　　　　1,752,702
APPARATUS FOR MANUFACTURING HOLLOW TILE
Filed July 9, 1927　　　4 Sheets-Sheet 4

Patented Apr. 1, 1930

1,752,702

UNITED STATES PATENT OFFICE

ROY A SHIPLEY, OF CANTON, OHIO, ASSIGNOR TO NATIONAL FIRE PROOFING COMPANY, OF PITTSBURGH, PENNSYLVANIA, A CORPORATION OF PENNSYLVANIA

APPARATUS FOR MANUFACTURING HOLLOW TILE

Application filed July 9, 1927. Serial No. 204,485.

My invention relates to apparatus for manufacturing hollow tile, and particularly to apparatus for manufacturing hollow tile having an end wall formed integrally with side walls.

In certain types of building construction it is common practice to set tile in spaced relation and to pour concrete in the spaces around the tile to form a monolithic structure. If the tiles are open at both ends, a considerable quantity of the cement flows into the open ends of the tiles and is wasted. In certain classes of work this waste runs from 25 to 45 per cent of the concrete used and constitutes an appreciable amount of dead weight.

One example of such use is the pouring of floors supported by concrete beams extending in two directions. In such floors a plurality of tile are arranged in groups with their outer walls constituting a form in which the concrete is poured. By closing one end of the tiles and placing the open ends of a plurality of tiles in engagement, it is possible to arrange a group of tiles to present a continuous surface to the concrete. The surfaces of the tiles may be roughened to afford a better contact with the cement.

In the manufacture of such tile it has heretofore been impossible to close the end of the tile simultaneously with the formation of the side walls. It has been proposed to cement blocks of material other than the material constituting the side walls of the tile in one end of the tile. In such a construction the lines of juncture between the body of the tile and the insert are liable to open during handling and with age. The steps necessary to place and cement the insert materially increases the cost of the tile.

I provide a tile in which the end wall is made integral with the side walls in a continuous moulding operation and from the same material. The tile is free from lines of juncture and is of uniform constituency and thickness throughout.

In the manufacture of such tile I use a mould of a type heretofore used in the manufacture of hollow tile and provide a support spaced a distance below the face of the mould. The support is releasably retained in the closed position so that when clay or other material is forced through a mould or die, the space between its lower surface and the support is filled with compressed material. The support is provided with openings through which material is extruded so as to show when the space is completely filled. When the space has become filled, the support is lowered at a rate of movement corresponding to the rate of movement of material through the die, thereby forming the side walls of the tile. The support is lowered a distance equal to the length of the tile after which the tile is cut from the material in the die, the support returned to its closed position and the operation repeated.

In the accompanying drawings, which illustrate the present preferred embodiment of my invention, Figure 1 is a perspective view of a two-way floor embodying my invention;

Figure 2 is a broken perspective view of a tile embodying my invention;

Figure 6 is a bottom plan view of the structure shown in Figure 4.

Figure 3:
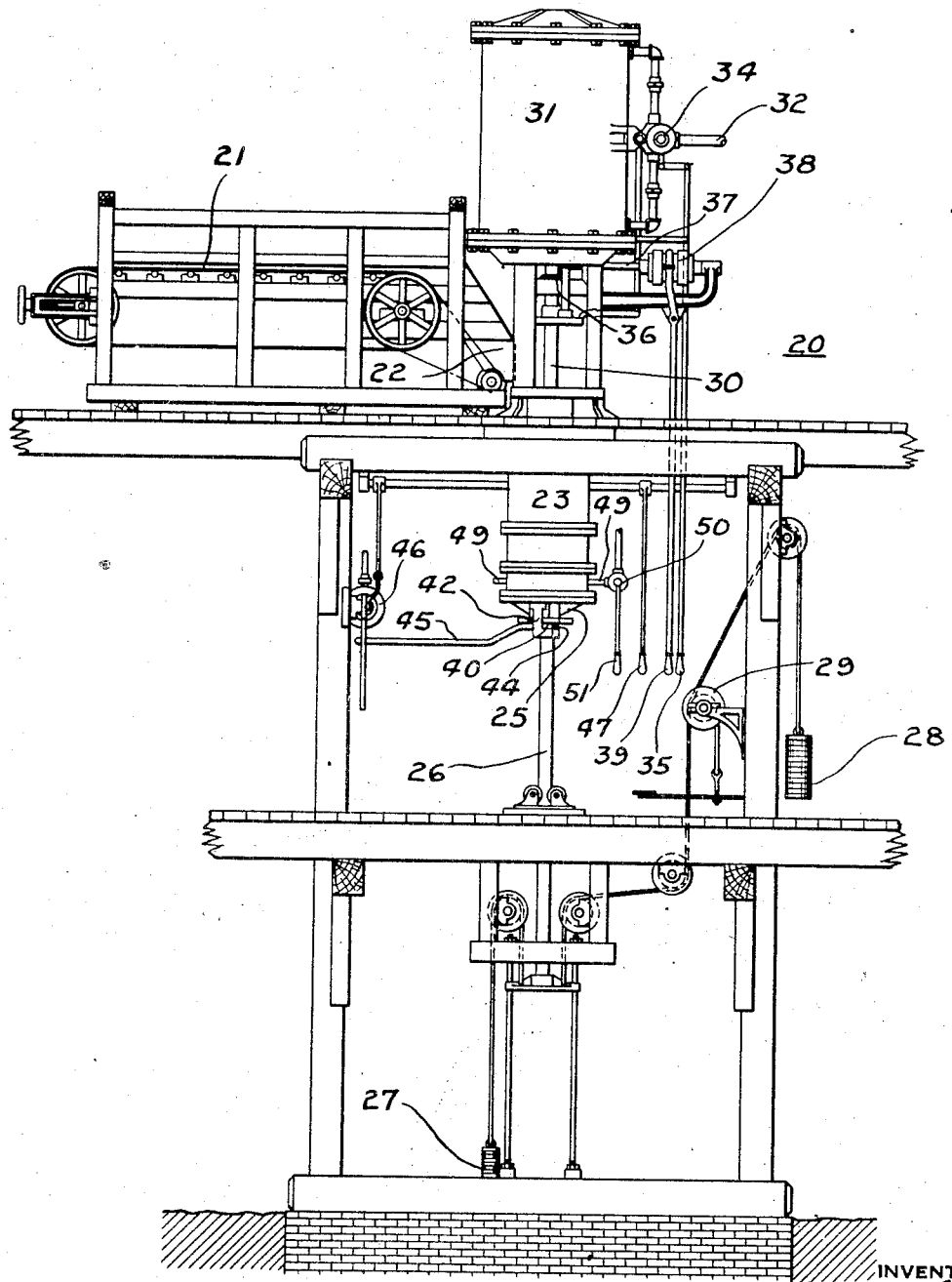
Figure 3 is an elevational view of a press for making the tile.

Referring to Figure 1, a floor 2 comprises spaced apart tile 3 supported by intersecting concrete beams 4 and 5 extending from different walls, not shown, and surrounding the hollow tiles. Beams 4 and 5 constitute what is known as a two-way floor construction. The beams 4 and 5 contain tensioning rods 7. Each tile 3 has an open end 9 and a closed end 10. The tiles are arranged in pairs with the open ends abutting.

In constructing the floor 2, the tiles 3 are supported by a form with the closed ends 10 and side walls constituting continuous unbroken surfaces which prevent concrete entering the tile when the beams 4 and 5 are poured. This does away with the waste which has been occasioned by the concrete entering the hollow ends of the tiles. In some cases 25% to 45% of the concrete poured has entered the hollow tiles and been of no service in supporting the floor. Also the weight of the wasted concrete has had to be supported by the concrete beams. By completely closing one end of each tile 3 and placing the open ends of the tiles in engagement, this waste is eliminated.

Referring to Figure 2, each tile 3 comprises the end wall 10, side walls 11 and bracing walls 12. The tile is formed in a single moulding operation. The walls 10, 11 and 12 are composed of a single body of material thereby obtaining uniform consistency throughout the tile and eliminating any joints that would exist were the end walls 10 attached to the side walls 11 after they were formed. The outer faces of the walls 10 and 11 are provided with grooves 15.

Figure 3 shows a moulding machine 20 comprising a conveyor 21 for supplying ceramic material through a hopper 22 to a cylinder or press 23 enclosing a die 24. A support 25 carried by a plunger 26 is urged against the bottom of the cylinder by counterweights 27 and 28. A brake 29 is provided for controlling the rate of movement of the counterweight 28. A plunger 30 extends into the press 23 and is actuated from a cylinder 31 the ends of which are connected to a pipe 32 leading to a boiler (not shown) by a valve 34 controlled by a pull rod 35.

A turning movement is given to the plunger 30 by a gear 36 driven from a shaft 37 carrying a clutch 38 controlled by a pull rod 39. The parts of the press heretofore described, may be of any preferred construction, since they form no part of the present invention except as they are necessary to complete the combination hereinafter described.

Referring to Figures 3 and 6, the support 25 is provided with lugs 40 engaging hooks 42 carried by the cylinder 23. The hooks 42 face in the same direction to permit the support 25 and the plunger 26 to be given a turning movement by the handle 44. A projecting arm 45 is carried by the support 25 for actuating it by a cylinder 46 controlled by a pull rod 47. The support 25 is provided with a plurality of openings 48 through which the ceramic material is extruded to indicate the completion of an operation hereinafter described. The press 23 is connected by pipes 49 and a valve 50 to a source of compressed air. The valve 50 is controlled by a pull rod 51.

Figure 4:
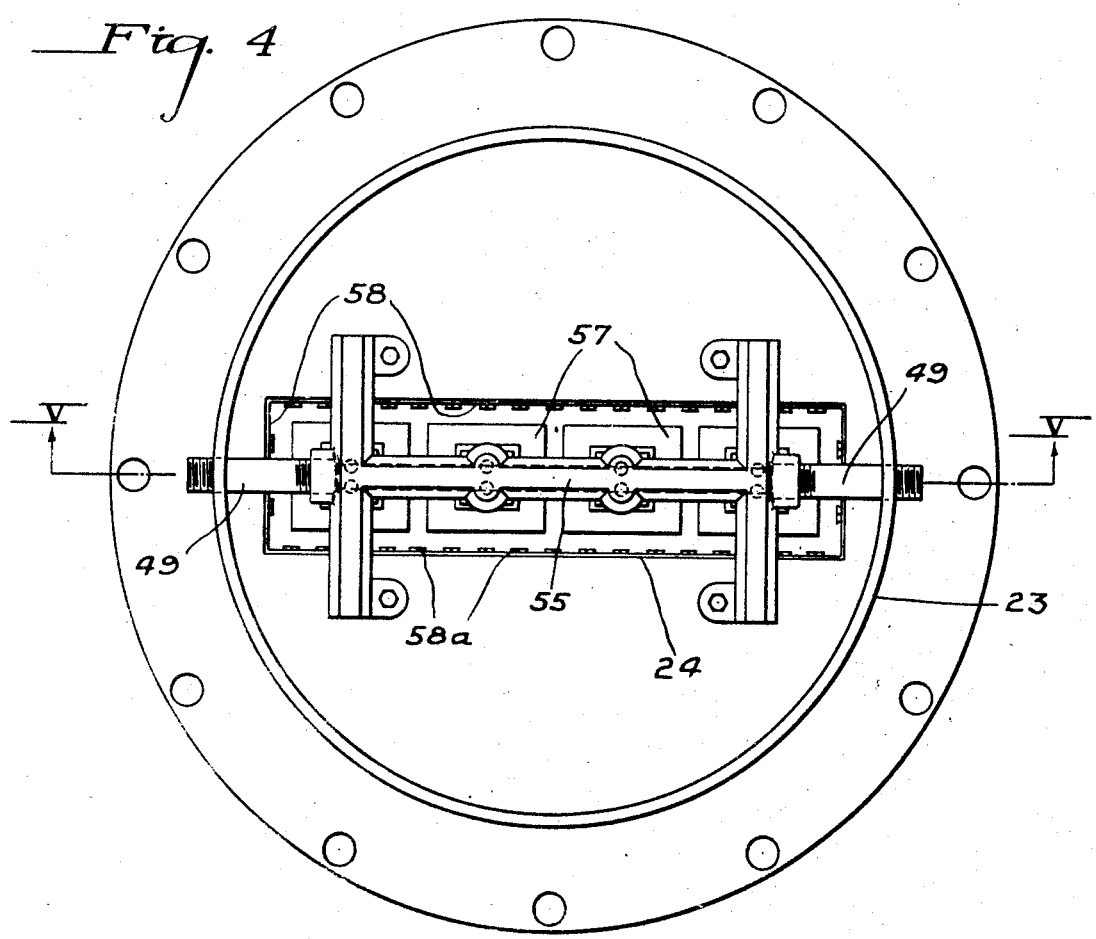
Figure 4 is a plan view of the die mechanism of the press.
Figure 5:
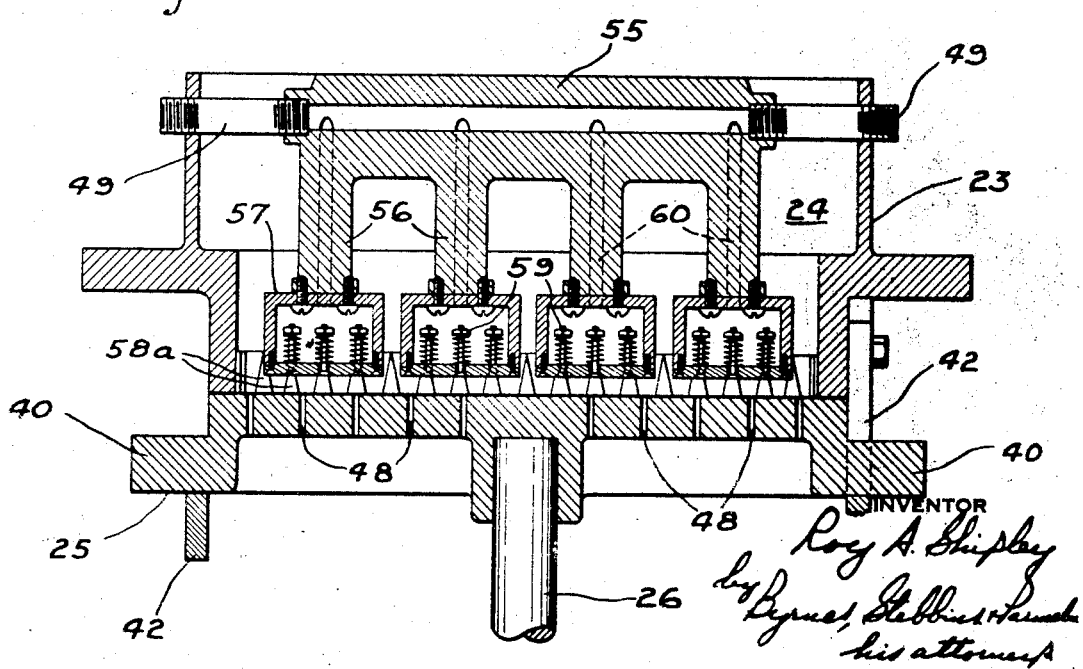
Figure 5 is a sectional view of the tile-forming die taken along the section line V—V of Figure 4.

Referring to Figures 4 and 5, the die 24 is supported within the cylinder 23 and is connected to the pipes 49. The die 24 comprises a frame 55 provided with a plurality of projecting portions 56 each of which terminates in a rectangular form 57. The spaces between the projecting portions 56 are open to the material in the cylinder 23 to permit it to pass between the forms 57 for forming the walls 12 of the tile. The lower faces of the forms 57 are spaced from the support 25 a distance equal to the thickness of the end wall 10. The side walls 58 of the press 24 are provided with a plurality of raised wedge-shaped lugs $58^a$ that form the grooves 15 in the outer surfaces of the tile.

The interior of each form 57 is provided with a plurality of valves 59 opening outwardly when pressure is applied from the pipes 49 through openings 60 in the projecting portions 56.

In the manufacture of tiles the ceramic material is fed into the cylinder 23 from the conveyor 21 and the support 25 raised and latched on the hooks 42. The valve 34 is then operated to move the plunger 30 downwardly and compress the material. If desired, the plunger 30 may be given a turning movement by the clutch 38 and beveled gear 36 for operating cutting blades (not shown) within the press.

As pressure is applied to the material in the cylinder 23, it is forced between the side walls of the press and the forms 57 to fill the space between the lower faces of the forms and the support 25. Pressure is applied until the entire space is filled as indicated by the appearance of the material at the mouths of the openings 48. The material occupying the space above the support 25 constitutes the end wall 10 of each tile. The material is of the same consistency as the side walls 11 and bracing walls 12. The support is then turned, either by manipulation of the handle 44 or the cylinder 46, to free it from the hooks 42.

The valve 50 is next operated to open the valves 59 in the several forms 57 to admit compressed air between the material constituting the end wall 10 and the face of the forms, thereby freeing the material.

Downward movement of the support 25 is caused by the pressure of the material passing through the die during the shaping operation of the walls 11 and 12. The rate of movement of the support 25 is governed by the brake 29. When a sufficient length of material has passed through the die, the material is severed by a cutting operation with a wire, well known in the art, and the tile is removed from the support 25 preparatory to a steaming and firing in the kiln.

The support 25 is then returned to its initial position and latched. The valve 34 is operated to raise the plunger 30 preparatory to supplying the press 24 with additional material. The foregoing cycle of operations may be continued indefinitely.

While I have described the tile in connection with two-way floors it is to be understood that it is adaptable for all uses to which tile is put. It is to be understood that various changes may be made in the invention without departing from the scope of the appended claims.

I claim:

1. In a molding machine, a die, a support placed at a distance therefrom, means for forcing material through the die to fill the space between it and the support, means for controlling the movement of the support after the space is filled, and means for forcing the material confined in the space away from the die upon movement of the support.

2. In a molding machine, a die, a support placed at a distance therefrom, means for forcing material through the die to fill the space between it and the support, means for controlling the movement of the support after the space is filled, and means for introducing fluid under pressure between the surfaces of the die and ceramic material for forcing the material confined in the space between the support and die away from the die upon movement of the support.

In testimony whereof I have hereunto set my hand.

ROY A. SHIPLEY.